July 19, 1966 J. B. GUNN ET AL 3,262,059

AMPLIFIER OR GENERATOR OF OPTICAL-MODE WAVES IN SOLIDS

Filed Aug. 29, 1962

INVENTORS
JOHN B. GUNN
PETER J. PRICE
BY John F. Ohlandt Jr.
ATTORNEY 3,262,059
Patented July 19, 1966

3,262,059

AMPLIFIER OR GENERATOR OF OPTICAL-MODE WAVES IN SOLIDS

John B. Gunn, Yorktown Heights, and Peter J. Price, New York, N.Y., assignors to International Business Machines Corporation, New York, N.Y., a corporation of New York Filed Aug. 29, 1962, Ser. No. 220,320
6 Claims. (Cl. 330—5)

This invention relates to the generation and amplification of electromagnetic waves and, in particular, to methods and apparatus for obtaining efficient generation and amplification of such waves by the exploitation of novel effects in crystalline solids.

In the prior art, there have existed many basic techniques for producing the generation and amplification of microwaves and of extremely high frequency waves, on the order of $10^{15}$ cycles/sec., in the light-wave region of the electromagnetic spectrum. Conventional devices in the microwave range such as the traveling wave tube and its particular variant, the backward wave oscillator, as well as the magnetron oscillator and others, have been pushed to their practicable limits in obtaining extremely high frequency operation. Another device which has achieved prominence in recent years is the maser which is a device relying on atomic and molecular processes. The term "maser" stands for microwave amplification by stimulated emission of radiation. Recently the maser concept has been applied to the generation of wave lengths in the infrared, visible and ultraviolet ranges of the electromagnetic wave spectrum in what have come to be known as "lasers." Limitations are imposed upon realizable frequencies of operation for masers in that suitable atomic or molecular energy levels have been available only for certain regions of the spectrum, and they must be operated at relatively high power levels in order that the emission simulated therefrom will be as large as that spontaneously emitted. As a result of these limitations it is only with extreme difficulty that frequencies below the infrared can be produced.

The present invention depends upon an entirely different principle of operation from the aforesaid prior art devices and is based upon novel effects and phenomena due to the lattice vibrations in crystalline solids. For a general background on the subject of lattice vibrations reference may be made to chapter V of "Introduction to Solid State Physics" by Charles Kittel, Wiley & Sons, 1953.

It is a primary object of the present invention to capitalize upon certain unique phenomena involving the interaction between charge carriers and optical-mode waves in crystals and particularly in polar crystals.

Another object is to exploit the ability to generate and amplify lattice optical-mode waves in crystals.

A further object is to provide for efficient generation and amplification of electromagnetic waves in the region around $10^{13}$ cycles/sec.

The foregoing and other objects, features and advantages of the invention will be apparent from the following more particular description of a preferred embodiment of the invention, as illustrated in the accompanying drawings.

Figure 1:
FIG. 1 is a sketch depicting the illustrative case of a longitudinal optical mode of vibration in a polar crystal such as gallium arsenide.

It has recently come to be realized that there can exist cooperative interactions of a traveling-wave nature between coherent waves of lattice vibration in solid materials and a stream of free charge carriers moving through the materials. In the cases which have been considered previously, the lattice modes have been acoustical in nature and the potential with which the carriers interact has arisen either from changes in the energy gap, from the relative displacement of conduction band minima, or from piezoelectric polarization resulting from certain transverse modes of vibration in polar lattices lacking a center of inversion. For detailed descriptions of the several cases listed above, reference may be had to (1) G. Weinreich, Phys. Rev. 104, 321 (1956); (2) G. Weinreich, T. M. Sanders and H. G. White, Phys. Rev. 114, 33 (1959); and (3) A. R. Hutson and D. L. White, J. Appl. Phys. 33, 40 (1962).

In the last case described in reference (3) above, the interaction is strong because it is a long range one and the amplification of sound waves and effects on the electrical conductivity have been observed. See for example (4) A. R. Hutson, J. H. McFee and D. L. White, Phys. Rev. Letters 7, 237 (1961), and (5) R. W. Smith, Phys. Rev. Letters 9, 87 (1962).

What has been discovered, thus constituting the underlying basis of the present invention, is that traveling wave interactions exist between charge carriers and what are hereby designated generically as lattice optical-mode waves. In principle, interactions can take place with all optical modes even in elemental semiconductors, but the singular instance in which the interaction is most significant exists in one species of solids, namely polar crystals.

Although the theory upon which the present invention is based is a general one, reference hereinafter will be made to the illustrative example of those optical modes of vibration of a polar lattice for which the particle motion has a longitudinal component, denoted by the term "polar waves." These modes consist of a motion which can be described, over a small region, as a collective displacement of the positive ions with respect to the negative ones, the propagation direction of the waves being parallel to the displacement for the particular case of purely longitudinal polar waves. These modes which exist in compounds are characterized by a very high frequency, approximately $10^{13}$ sec.$^{-1}$, which is nearly independent of wave length and can be amplified by interaction with a stream of holes or electrons whose drift velocity is slightly greater than the phase velocity of the wave.

These interactions referred to above are as strong as those described in reference (3) listed above but differ in the following respects: (*a*) the frequencies involved are much higher, being approximately $10^{13}$ sec.$^{-1}$ as compared with $10^7$ sec.$^{-1}$; (*b*) the potential arises from the ordinary dielectric polarization of the lattice and, thus, will be present in all semiconductors in which there is a lattice contribution to the dielectric constant; and (*c*) because of the nature of the polar wave spectrum, the interaction is not restricted to the neighborhood of one particular value of drift velocity and the resulting amplification is of a backward wave variety.

The stimulus for the following analysis has come from observations of conduction instabilities in gallium arsenide when the drift velocity exceeds the velocity of sound by a large factor. Although not all of the various effects are understood, the analysis is presented here for a fuller appreciation of the principles governing the present invention, although not considered absolutely necessary for understanding the operation thereof.

SECTION A—THEORETICAL ANALYSIS

The present analysis which is restricted to one dimension, $x$, assumes a lattice capable of supporting polar waves with wave vector $k$ and frequency $\omega$. Flowing through the lattice is a unipolar stream of charge carriers which, in the absence of the polar wave, would have a uniform drift velocity $v_0$ resulting from an externally applied electric field. Their response to the lattice polarization is approximated by a macroscopic transport equation, and the effect of their space charge on the polarization by an equation which takes account of the dispersion in the function $\omega(k)$ in only a crude way. Both of these equations restrict the range of validity of the analysis to small values of $k$.

I. *Equations of motion*

It is assumed that the solid is a semiconductor containing a uniform charge density $-\rho_0$ of ionized impurity ions. In the absence of electric fields, this is compensated by a charge $+\rho_0$ of free carriers; in non-equilibrium situations an additional space charge $\rho$ may be present due to the carriers. The equation of charge conservation when combined with that for charge transport gives $$\frac{\partial\rho}{\partial t}=-\frac{\partial}{\partial x}\left\{\mu E(\rho+\rho_0)-D\frac{\partial\rho}{\partial x}\right\} \qquad (1)$$

Here $\mu$ is the carriers' mobility and D their diffusion constant, and E is the electric field which they experience. This field includes both a term $E'$ due to the uncompensated space charge $\rho$ and a contribution due to the polarization of the lattice. The first term is given by Poisson's equation:

$$\frac{\partial E}{\partial x}=4\pi\rho \qquad (2)$$

The polarization of the lattice may be described by the displacement of a positive ion, mass $M^+$, with respect to the negative ion, mass $M^-$, in the same unit cell. If this distance (in the $x$-direction) is $u$, a convenient variable to use is $$w=ua^3[(M^++M^-)/M^+M^-]^{1/2} \qquad (3)$$

where $a$ is the lattice constant. It has been shown (see M. Born and K. Huang, "Dynamical Theory of Crystal Lattices" (Oxford University Press, 1954), p. 88) that the relation between E and $E'$ is given by $$E=-\omega_1\theta^{1/2}w+\frac{1}{\epsilon_\infty}E' \qquad (4)$$

where $\omega_1$ is the angular frequency of polar waves at $k=0$, $\theta$ is equal to $$4\pi\left(\frac{1}{\epsilon_\infty}-\frac{1}{\epsilon_0}\right)$$

and $\epsilon_\infty$ and $\epsilon_0$ are respectively the high and low-frequency dielectric constants. The time dependence of $w$ we take to be given by the following equation valid for moderately long wavelengths:

$$\frac{\partial^2 w}{\partial t^2}=-\omega_1^2\left(w+\gamma a^2\frac{\partial^2 w}{\partial x^2}\right)+\frac{\omega_1\theta^{1/2}}{4\pi}\left(E'+\frac{1}{16}a^2\frac{\partial^2 E'}{\partial x^2}\right) \qquad (5)$$

This equation differs from the dispersionless one given in the M. Born et al. reference, only by the inclusion of the terms in $a^2\partial^2/\partial x^2$, which take account of the fact that forces can be evaluated only at lattice sites. It gives the dispersion relation:

$$\omega^2=\omega_1^2(1-\gamma k^2a^2) \qquad (6)$$

for the free polar vibrations of the lattice, which is sufficiently accurate near $k=0$ for our purposes. From the last equation, $\gamma$ may be evaluated by comparison with experiment. Its value will be near 1/16 for most lattices.

II. *Derivation of the dispersion relation for the coupled system*

We begin by splitting the electric field E into a constant, externally imposed part $E_0$ and a small fluctuating component $E_1$. Equation 1 may then be linearized by dropping the term in $\rho E_1$, giving $$\frac{\partial\rho}{\partial t}+\mu E_0\frac{\partial\rho}{\partial x}+\mu\rho_0\frac{\partial E_1}{\partial x}-D\frac{\partial^2\rho}{\partial x^2}=0 \qquad (7)$$

The space charge may be eliminated between this and Equation 2 giving $$\frac{1}{4\pi}\left(\frac{\partial^2}{\partial x\,\partial t}+\mu E_0\frac{\partial^2}{\partial x^2}-D\frac{\partial^3}{\partial x^3}\right)E'+\mu\rho_0\frac{\partial E_1}{\partial x}+0 \qquad (8)$$

The constant part may be substracted from each side of Equation 4 and the resulting equation, together with Equation 5, used to eliminate $E_1$ and $E'$ from Equation 8.

$$\left\{-D\frac{\partial^3}{\partial x^3}+\mu E_0\frac{\partial^2}{\partial x^2}+\frac{\partial^2}{\partial x\partial t}+\frac{4\pi\mu\rho_0}{\epsilon_\infty}+\frac{\partial}{\partial x}\right\}\left\{\frac{\partial^2 w}{\partial t^2}+\omega_1^2\left(w+\gamma a^2\frac{\partial^2 w}{\partial x^2}\right)\right\}-\theta\omega_1^2\mu\rho_0\left(1+\frac{1}{16}a^2\frac{\partial^2}{\partial x^2}\right)\frac{\partial w}{\partial x}=0 \qquad (9)$$

We now look for solutions in the form $$w=\exp\, i(\omega t-kx) \qquad (10)$$

with the expectation that the relationship between $\omega$ and $k$ may be complex. After dividing out the trivial solution $k=0$, we obtain the equation $$(iDk^2+v_0k-\omega+i\omega_r)(\omega_1^2-\omega^2-\gamma\omega_1^2a^2k^2)=i\theta\omega_1^2\sigma_0(1-\tfrac{1}{16}a^2k^2) \qquad (11)$$

where we have made the abbreviations $v_0=\mu E_0$, $\sigma_0=\mu\rho_0$, and written $\omega_r$ for the reciprocal, $4\pi\sigma_0/\epsilon_\infty$, of the dielectric relaxation time. When $\sigma_0=0$, this is seen to factor into two uncoupled dispersion relations, one for the free polar waves and one for the electrons in a uniform field. For the coupled system, the relation between $\omega$ and $k$ is complex. One may assume that either one of these variables is real, and solve for the complex value of the other, depending on the boundary conditions to be imposed. If the spatial distribution of $w$ is given at $t=0$ (Case ($a$)), then it is appropriate to take $k$ to be real, whereas, if the time variation at a fixed point is prescribed (Case ($b$)), $\omega$ is real. In either case, the solutions of interest are those which, for vanishing $\sigma_0$ become the values $\omega_0$, $k_0$ which satisfy Equation 6. These solutions describe the effect on the polar waves of interaction with the conduction current. For small $\sigma_0$, Equation 11 may be solved by a simple perturbation technique, and the results are Case ($a$):

$$\omega=\omega_1-i\omega_2$$
$$=\omega_0-\frac{\omega_1^2\theta\sigma_0}{2\omega_0}\cdot\frac{(Dk_0^2+\omega_r)}{(v_0k_0-\omega_0)^2+(Dk_0^2+\omega_r)^2}-i\frac{\omega_1^2\theta\sigma_0}{2\omega_0}\cdot\frac{(v_0k_0-\omega_0)}{(v_0k_0-\omega_0)^2+(Dk_0^2+\omega_r)^2} \qquad (12)$$

Case ($b$):

$$k=k_1-ik_2$$
$$=k_0-\frac{\theta\sigma_0}{2\gamma a^2k_0}\cdot\frac{(Dk_0^2+\omega_r)}{(v_0k_0-\omega_0)^2+(Dk_0^2+\omega_r)^2}-i\frac{\theta\sigma_0}{2\gamma a^2k_0}\cdot\frac{(v_0k_0-\omega_0)}{(v_0k_0-\omega_0)^2+(Dk_0^2+\omega_r)^2} \qquad (13)$$

III. *Application*

From the form of the denominators in Equations 12 and 13, we see that strong interaction between polar waves and free carriers is possible in that part of ($k$, $\omega$) space where their uncoupled dispersion relations approach each other closely—that is, where the waves' phase velocity $v_p=\omega_0/k_0$ is comparable with the carriers' drift velocity $v_0$. This is akin to the interaction between shear waves and free carriers discussed in reference (3). In addition to a small change in the real part of $\omega$ or $k$ (representing a change in phase velocity), imaginary components appear representing an exponential growth or decay. Since we took as a solution the wave $w=\exp i(\omega t-kx)$, in Case (*a*), the wave amplitude varies as $\exp(\omega_2 t)$, and in Case (*b*) as $\exp(-k_2 x)$. The group velocity $v_g$ of polar waves is given by $$v_g=d\omega/dk=-\gamma\omega_1^2 a^2 k_0/\omega_0 \quad (14)$$

and is opposite in direction to $k_0$. Now, when $v_0k_0-\omega$ is small but positive, both $\omega_2$ and $k_2$ have their largest positive values. This implies that, in Case (*a*), supra, a wave grows with time, or in Case (*b*), supra, that it increases in the $-x$ direction. Since the latter is seen, from Equation 14 to be the direction of energy transport, both cases correspond to amplification of the wave. Correspondingly, when $v_0k_0-\omega$ is negative, there is attenuation.

The location of the maxima of $k_2$ and $\omega_2$ as functions of $k_0$ is difficult, because it requires the solution of an equation of the fourth or fifth order. In practice, the relation $D\,\omega^2/v_0^2>>\omega>>\omega_r$ will often hold, and that case only the term in D in the denominators of Equations 12 and 13 need be retained. We may also make the approximations $\omega_0-\omega_1<<\omega_1$, $v_g<<v_0$. The resulting maximum values are Case (*a*):

$$\omega_{2\,\mathrm{max.}}=\frac{3^3}{2.4^4}\,\frac{\theta\sigma_0 v_0^4}{D^2\omega_1^2}\text{ at }k_0=\frac{4}{3}\,\frac{\omega_1}{v_0} \quad (15)$$

Case (*b*):

$$k_{2\,\mathrm{max.}}=\frac{4^4}{2.5^5}\,\frac{\theta_0\sigma_0 v_0^5}{\gamma a^2 D^2\omega_1^4}\text{ at }k_0=\frac{5}{4}\,\frac{\omega_1}{v_0} \quad (16)$$

Thus, the effect of the drifting carriers is to select certain polar modes out of the available spectrum, and amplify them at a rate which is calculable in terms of known constants of the material.

SECTION B

From the foregoing analysis we turn now to the practical aspects of the present invention. Referring to FIG. 1, there is shown a sketch which depicts the movement of ions, which are oppositely charged, in a typical polar lattice such as gallium arsenide. The oppositely charged ions move in opposite directions parallel to propagation in what is known as the purely longitudinal optical mode of vibration. Such a mode may be excited by electric fields. This mode differs from the transverse mode depicted in FIG. 5.4 of the Kittel reference supra. However, although a specific reference is being made here to the polar waves as those which by theoretical analysis will be most significant in the production of electromagnetic wave generation, interaction is not ruled out between the transverse optical-modes, or non-polar longitudinal optical modes, as depicted in FIG. 5.4. Further, the term "longitudinal mode" embraces also the longitudinal component of a mode which deviates from longitudinal.

It must be emphasized at this point that the vibrations under discussion are those on an atomic or molecular scale.

Figure 2:
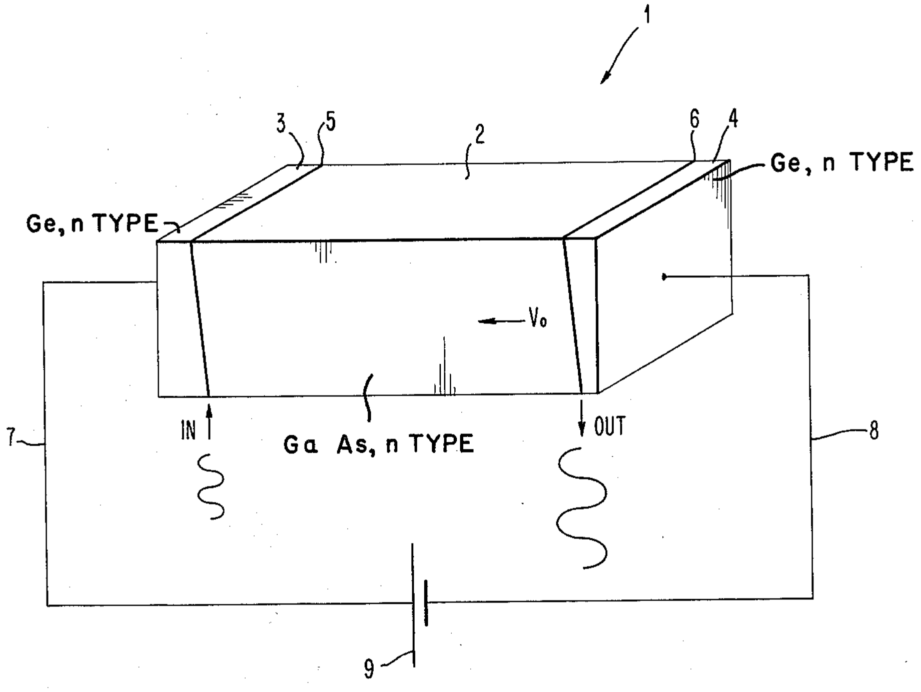
FIG. 2 is a view in perspective of a device, in accordance with one embodiment of the present invention, incorporated in a circuit for producing generation and amplification of extremely high frequency waves.

Referring now to FIG. 2, an embodiment is illustrated which includes a semiconductor structure, generally designated 1, comprising a body 2 of the polar crystal gallium arsenide which is doped, typically on the order of $3\times10^{15}$ atoms/cc., and is of N-conductivity-type by reason of the use of a donor impurity such as tellurium. N contacts 3 and 4 are composed of germanium which is likewise of N-conductivity-type, being doped with antimony. The contacts 3 and 4 are produced on the body 2 by a technique such as vapor growth, well known in the art. Junctions 5 and 6 exist at the interface between the germanium contact 3 and the germanium contact 4 respectively with the body 2. Conductors 7 and 8 are attached to the germanium contacts, typically by soldering. A source of potential 9, shown here as a battery, is connected with its positive terminal to conductor 7 and its negative terminal to conductor 8. The imposition of the source of potential across the N contacts 3 and 4 of body 2 results in the creation of an electric field in the body on the order of 2000 volts/cm. The established electric field produces a drift velocity for the carriers, which in this instance are electrons, and the drift velocity is denoted by the symbol $v_0$ with the arrow in the figure indicating direction of flow.

In accordance with the principles previously expounded, the drift velocity for carriers $v_0$ is made large enough to produce amplification in the crystal body 2. Thus, with $v_0$ greater than $\omega/k$, the polar wave generated in the crystal body grows with time as is implied from the previous theoretical analysis for Case (*a*). In Case (*b*) discussed above, it is amplified in the $-x$ direction.

It is of importance to calculate the magnitude of the effects involved and to compare them with the situation in gallium arsenide under conditions where instabilities in the conduction have been observed. For this we take the following parameters as typical:

$\sigma_0=3.3$ mhos cm.$^{-1}=3\times10^{12}$ e.s.u.
$a=6\times10^{-8}$ cm.
$D=1\times10^2$ cm.$^2$ sec.$^{-1}$
$\omega=5\times10^{13}$ sec.$^{-1}$
$\epsilon_0=12.5$
$\epsilon_\infty=10.9$ so that $\theta=0.15$. We then calculate what value of $v_0$ is needed to produce a value of $\omega_2$ equal to the observed value of about $3\times10^9$ sec.$^{-1}$. The result is $v=6\times10^7$ cm. sec.$^{-1}$, compared with the observed value of about $2\times10^7$ cm. sec.$^{-1}$. Thus, the mechanism considered is capable of producing the observed effects.

The ability to generate and amplify polar waves, which has not previously been possible, leads to several applications. However, some way must be provided of coupling external electromagnetic waves to the polar waves inside the crystal so that the unique ability to generate and amplify coherent oscillations in this frequency range can be exploited. Several arrangements may be provided:

*(1) Coupling to light waves of the same frequency*

Direct interaction within the bulk of a uniform crystal is not possible, because the wave vector $k_p$ of the polar waves is much greater than that $k_L$ of light waves having the same frequency (in free space, these light waves will have lengths of about 30$\mu$). At a surface of discontinuity, however, interaction is possible if the components of $k_p$ and $k_L$ in the plane of the surface are equal. This means that $k_p$ must be nearly normal to the surface. However, since $k_p$ is parallel or nearly parallel to the direction of current flow, at any free surface it cannot be nearly normal to that surface. Thus, to act as a transducer, a surface must be an internal one across which current can flow. Such a surface might be a grain boundary, a stacking fault, or a heterojunction with another conducting solid, which should preferably be optically transparent at the frequencies in question. The heterojunctions 5 and 6 of FIG. 2 are surfaces of this last type.

It will be noted that the contacting surfaces of the heterojunctions 5 and 6 are sloping lines. These junctions are preferably formed in this way in order to prevent the possibility of a perfectly symmetrical condition existing within the crystal lattice such that the individual wavelets which are produced will tend to cancel each other.

Interaction is also possible at localized structural features whose size is comparable with or less than $k_p^{-1}$. Such features might be point structural defects, such as substitutional impurities with different charge or mass from the ion they replace, vacancies, or interstitial atoms, or line defects such as dislocations. All the foregoing may be introduced artificially by well-known techniques, but, except in the unlikely case that they can be introduced as a regular array, they will couple the light and polar waves in random phases. The sum of their scattering amplitudes will not cancel, but will be proportional not to their number, but to their square root. It is also just possible that artificial features, such as surface roughness or pin-holes in an opaque film covering the surface, might have the necessary small scale.

(2) *Coupling to light waves of higher frequency*

The wavelength of polar waves which are amplified by interaction with the electrons is comparable with that of light waves of about $10^3$ times their frequency. Thus, such light waves can be diffracted by polar waves, which behave almost like a stationary diffraction grating. The condition for diffraction is that $k_L - k'_L = \pm n k_p$, where $k_L$, $k'_L$ are the wave vectors of the incident and diffracted light, respectively, and $n$ is an integer not zero. The incident and diffracted waves also differ in frequency by the frequency of the polar waves. Thus, a beam of X-rays could be modulated and shifted in frequency under the control of an electrical signal applied to a crystal so as to generate polar waves. Alternatively, two incident X-ray beams meeting the conditions of diffraction would give rise to a polar wave which could then be amplified by the mechanism of this disclosure. Thus, the mixer and I.F. amplifier of an X-ray superheterodyne receiver would be realized.

Referring again to FIG. 2, the interaction in the crystal, between the carriers which have the drift velocity $v_0$ and the polar waves gives rise to gain when the waves' phase velocity has the same direction as the carrier flow but is smaller than $v_0$, and attenuation for a wave with equal but oppositely directed phase velocity. Any two discontinuities in the solid which can reflect waves back and forth along the direction of carrier flow will give rise to oscillation if the product of amplification along the path between them times the attenuation in the opposite direction times their reflection coefficients exceeds unity. The self-oscillations are taken from the crystal body 2 at the interface 6 and appear as indicated by the arrow labelled "out" in FIG. 2. Such discontinuities may take the form of coupling interfaces 5 and 6, or other natural occurring or artificially produced features such as those mentioned previously as transducers.

What has been disclosed is a novel principle embodied in a crystalline solid based upon the mechanism of the interaction between lattice optical-mode waves and a stream of carriers. Such a principle can be used alone or exploited to provide amplification of electromagnetic waves. Such a mechanism is particularly adapted to the generation and amplification of electromagnetic waves in the frequency spectrum around $10^{13}$ sec.$^{-1}$.

Although the underlying theory and practical embodiment of the concept of the present invention has been principally discussed by reference to the example of a polar crystal, it will be apparent that the theory and practical applications are not so limited. Further, although as an illustrative embodiment, a specific binary compound has been referred to, it will be obvious that other binary compounds, including the III–V and II–VI compounds may be used as well. Further compounds having more than two elements may be utilized in accordance with the principles herein disclosed. Some of these compounds having more than two atoms per unit cell can be expected to have abnormally low frequencies which can likewise be advantageously exploited.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Wave translating apparatus comprising:

(a) a body of crystalline material containing mobile charge carriers;

(b) said body having internal optical mode lattice vibrations which propagate in said body at a phase velocity $V_p$;

(c) means connected to said body for applying a voltage across said body to produce current flow through said body and cause said charge carriers to flow in said body at a drift velocity $V_0$ which is greater than said phase velocity $V_p$;

(d) said charge carriers flowing at said drift velocity $V_0$ exchanging energy with said optical mode lattice vibrations to amplify said optical mode lattice vibrations;

(e) and internal means within said body of crystalline material through which said optical mode vibrations propagate for radiating an electromagnetic output from said body.

2. Wave translating apparatus comprising:

(a) a body of crystalline material containing mobile charge carriers;

(b) said body having internal optical mode lattice vibrations which propagate in said body at a phase velocity $V_p$;

(c) means connected to said body for applying a voltage across said body to produce current flow through said body and cause said charge carriers to flow in said body at a drift velocity $V_0$ which is greater than said phase velocity $V_p$;

(d) said charge carrier flowing at said drift velocity $V_0$ exchanging energy with said optical mode lattice vibrations to amplify said optical mode lattice vibrations;

(e) said body including at least one internal surface across which said current flows and at which there is a discontinuity in the crystal structure of the body for providing a radiative output at the frequency of said optical mode vibrations.

3. The apparatus of claim 2 wherein:

said body includes a first section of a first type semiconductor material and a second section of a second semiconductor material;

said first and second sections being joined together at a heterojunction to form said internal surface.

4. The apparatus of claim 3 wherein said body includes a third section of said second semiconductor material joined with said first section at a heterojunction to form a second internal surface of the crystal body at which there is a discontinuity in the crystal structure of the body.

5. Wave translating apparatus comprising:

a body of crystalline material having a discontinuity in the crystal structure of the body at an internal surface in the body between first and second sections of the body;

said first section containing mobile charge carriers and having internal optical mode lattice vibrations which propagate in said body at a phase velocity $V_p$;

means connected to said first and second sections for applying a voltage across said body to produce current flow through said first and second sections across said discontinuity;

said applied voltage causing said charge carriers to flow in said first section of said body at a drift velocity $V_0$ which is greater than said phase velocity $V_p$;

said charge carriers flowing at said drift velocity $V_0$ exchanging energy with said optical mode lattice vibrations to amplify said optical mode lattice vibrations;

said optical mode lattice vibrations producing a radiative output at said discontinuity between said first and second sections of said body.

6. Wave translating apparatus comprising a body of crystalline material having a central section and first and second sections joined to said central section at either side of said central section;

the crystalline structure of each of said first and second sections being different than the crystalline structure of said central section at the surfaces where sections are joined to provide first and second discontinuities in said body;

said central section having mobile charge carriers therein and internal optical mode lattice vibrations which propagate in said central section at a phase velocity $V_p$;

and means connected to said first and second sections for producing current in said body through said discontinuities and said central region to cause said charge carriers to flow in said central section at a drift velocity $V_0$ which is greater than said phase velocity $V_p$;

said charge carriers flowing at said drift velocity $V_0$ exchanging energy with said optical mode lattice vibrations to amplify said optical mode lattice vibrations.

References Cited by the Examiner

UNITED STATES PATENTS

| | | | |
|---|---|---|---|
| 2,743,322 | 4/1956 | Pierce et al. | 330—5 |
| 2,760,012 | 8/1956 | Peter | 330—5 |
| 3,119,074 | 1/1964 | Chang | 330—5 |

OTHER REFERENCES

Erickson: "Electronics," Feb. 9, 1962, pages 26–27.

Anderson: "IBM Journal Research & Development," July 1960, pp. 283–289.

Neufeld: "The Physical Review," Nov. 15, 1959, pages 785–787.

Gurevich: "Soviet Physics Solid State," November 1962, pages 1015–1016.

ROY LAKE, *Primary Examiner.*

D. HOSTETTER, *Assistant Examiner.*